United States Patent
Seibel et al.

(10) Patent No.: US 12,392,449 B2
(45) Date of Patent: Aug. 19, 2025

(54) ARTICLE SECURING AND POSITIONING SYSTEM AND METHOD FOR AIRCRAFT CONTROL WHEEL

(71) Applicant: Textron Aviation Inc., Wichita, KS (US)

(72) Inventors: Michael John Seibel, Wichita, KS (US); Stephen Howard Fagan, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 148 days.

(21) Appl. No.: 18/180,627

(22) Filed: Mar. 8, 2023

(65) Prior Publication Data

US 2023/0288020 A1 Sep. 14, 2023

Related U.S. Application Data

(60) Provisional application No. 63/317,756, filed on Mar. 8, 2022.

(51) Int. Cl.
| | | |
|---|---|---|
| *F16M 11/20* | (2006.01) | |
| *F16M 11/10* | (2006.01) | |
| *F16M 13/02* | (2006.01) | |

(52) U.S. Cl.
CPC .......... *F16M 13/02* (2013.01); *F16M 11/105* (2013.01); *F16M 11/2021* (2013.01); *F16M 2200/022* (2013.01)

(58) Field of Classification Search
CPC ...... F16M 13/02; F16M 11/105; F16M 11/00; A47B 19/00; A47B 23/02; A47B 96/00; E05D 5/10
See application file for complete search history.

(56) References Cited

U.S. PATENT DOCUMENTS

| | | | |
|---|---|---|---|
| 3,543,326 A | | 12/1970 | Rohrberg et al. |
| 3,809,338 A | * | 5/1974 | Gross, Jr. ............... B64D 43/00 244/1 R |
| 5,222,690 A | * | 6/1993 | Jeffords ................ B64D 43/00 224/276 |
| 8,215,583 B2 | * | 7/2012 | Groomes ............ B64C 13/0423 244/129.1 |
| 10,520,128 B2 | | 12/2019 | Longo |
| D903,652 S | * | 12/2020 | Qiu .............................. D14/253 |
| 2010/0065694 A1 | * | 3/2010 | Duan ..................... F16M 11/10 16/386 |
| 2011/0101058 A1 | | 5/2011 | Heckman |
| 2014/0091192 A1 | * | 4/2014 | Mersky .................. F16M 11/08 248/447 |
| 2019/0211963 A1 | * | 7/2019 | Longo ................... G06F 1/1626 |

FOREIGN PATENT DOCUMENTS

| | | |
|---|---|---|
| CN | 109131910 A | 1/2019 |

* cited by examiner

*Primary Examiner* — Nkeisha Smith
(74) *Attorney, Agent, or Firm* — Avek IP, LLC

(57) ABSTRACT

Disclosed is an electronics device holder made to be mountable on an aircraft control stick arrangement. The holder enables two dimensions of rotation. Rotation clockwise and counterclockwise is provided by a disk on which the holder is mounted. The disk edges are trapped underneath a containing plate. Friction enables the disk, and thus, the holder to be held in different circular positions. A friction hinge is used to establish and hold different pitch positions for the electronics device.

18 Claims, 3 Drawing Sheets

ARTICLE SECURING AND POSITIONING SYSTEM AND METHOD FOR AIRCRAFT CONTROL WHEEL

CROSS-REFERENCE TO RELATED APPLICATIONS

This application claims the benefit of U.S. Provisional Application No. 63/317,756 filed on Mar. 8, 2022, the entire contents thereof are herein incorporated by reference.

BACKGROUND OF THE INVENTION

1. Field

The disclosed embodiments relate generally to the field of article mounts and positioning devices. More specifically, the field of mobile devices, e.g., tablet computers, mounted to aircraft structures, e.g., an aircraft yoke systems.

2. Description of the Related Art

Mobile devices have become a part of every-day life for many persons, including aircraft pilots. Pilots use these devices, not only for personal matters, but also professionally. For example, such devices can be used by the pilot for data entry and paperwork (recording). The pilot also can use such device to execute programs relating to and navigational aids such as aeronautical charts, navigation programs, weather applications, flight plans, flight planning, navigation and scheduling.

U.S. Pat. No. 10,520,128 to Longo discloses a tablet holder assembly that mounts to a yoke, allowing a pilot to attach/detach a tablet. Longo discloses a slider and a hook which function together to adjust the tablet holder.

U.S. Patent Application Publication No. 2011/0101058 to Heckman discloses a pivot mounting assembly mounted to a yoke of an aircraft wherein the pivot mount includes an upper portion rotatable around a lower portion. Heckman uses a shoulder screw to secure the lower portion to the upper portion and a shoulder which allows rotation of the upper portion with respect to the lower portion.

Chinese Patent No. 109,131,910 to Sun et al. discloses an electronic flight bag fixing bracket for fitting a tablet or digital display. The Sun arrangement uses a ball head rotatably mounted in a ball head seat backward and forward movement of the tablet is realized.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In some aspects, the techniques described herein relate to a system for positioning an electronics device holder, the system including: a bracket mounted onto a rear portion of an aircraft handle; a first side of a hinge connected to the bracket; the hinge accommodating an angular rotation in a first angular dimension relative to the aircraft handle; and a pivotal connection on a second side of the hinge, the pivotal connection establishing rotation in a second angular dimension, the second angular dimension being substantially parallel to a plane established by an electronics device being held in the electronics device holder.

In some aspects, the techniques described herein relate to a system wherein the hinge is a frictional hinge which enables the electronics device holder to remain in a position in the first angular dimension.

In some aspects, the techniques described herein relate to a system wherein a level of friction presented by the frictional hinge is made to be adjustable using an adjustment screw.

In some aspects, the techniques described herein relate to a system wherein the pivotal connection includes a disk made to be rotatable and frictionally but rotatably secured inside a structural arrangement between the electronics device holder and the hinge, the disk enabling the electronics device holder to remain in a position in the second angular dimension.

In some aspects, the techniques described herein relate to a system wherein a level of roll-resistance offered against this rotation of the electronics device holder is established by a level of tightness established by the structural arrangement in which the disk is secured.

In some aspects, the techniques described herein relate to a system wherein the structural arrangement includes a disk-receiving recess into which the disk is received, the disk being secured in the disk-receiving recess by a containing plate which is sized to have a diameter which is slightly smaller than a diametric size of the disk.

In some aspects, the techniques described herein relate to a system wherein a circular inner margin of the containing plate establishes a circular internally-extending ledge which contains the disk in the disk-receiving recess.

In some aspects, the techniques described herein relate to a system wherein the circular internally-extending ledge clamps down on an outer margin of the disk to create an amount of margin-applied friction against movement enabling establishment of a plurality of various circular positions of the electronics device holder.

In some aspects, the techniques described herein relate to a system wherein the margin-applied friction is established by one or more fasteners installed through the containing plate proximate the circular internally-extending ledge.

In some aspects, the techniques described herein relate to a system wherein the one or more fasteners include a plurality of clocked fasteners installed through the containing plate proximate the circular internally-extending ledge.

In some aspects, the techniques described herein relate to a system wherein the structural arrangement includes a base plate on which the disk-receiving recess exists, the disk-receiving recess being defined by an inner edge of one or more intermediate plates, the inner edge of the one or more intermediate plates being sized to include the disk.

In some aspects, the techniques described herein relate to a system wherein the plurality of clocked fasteners can be operatively tightened apply the margin-applied friction or loosened to reduce the margin-applied friction to establish a desired friction level.

In some aspects, the techniques described herein relate to a system wherein the plurality of clocked fasteners pass through the containing plate and the one or more intermediate plates then into the base plate.

In some aspects, the techniques described herein relate to a system wherein the bracket has a first portion that is mounted to the rear portion of the aircraft handle and a forwardly-extending portion on which the hinge is supported.

In some aspects, the techniques described herein relate to a system wherein the bracket is an L-bracket.

In some aspects, the techniques described herein relate to a system wherein the hinge is mounted on a forward end of the L-bracket such that the electronics device holder has freedom of movement.

In some aspects, the techniques described herein relate to a system including a spacer mounted between the first portion of the bracket and a center yoke portion of the handle, the spacer establishing a flush connection between the first portion of the bracket and the center yoke portion.

In some aspects, the techniques described herein relate to a system wherein the rotation in the first angular dimension is circular in either clockwise or counterclockwise directions.

In some aspects, the techniques described herein relate to a system wherein the rotation in the second angular dimension is pivotal upward or downward.

In some aspects, the techniques described herein relate to a system including: a first side of a friction hinge physically secured to an aircraft control stick assembly; a second side of the friction hinge supporting a disk; and a securement arrangement on a back side of an electronics holder, the securement arrangement configured to frictionally contain the disk such that the electronics holder is movable circularly into a plurality of clockwise and counterclockwise positions.

BRIEF DESCRIPTION OF THE SEVERAL VIEWS OF THE DRAWINGS

Illustrative embodiments are described in detail below with reference to the attached drawing figures, which are incorporated by reference herein and wherein.

Figure 1:
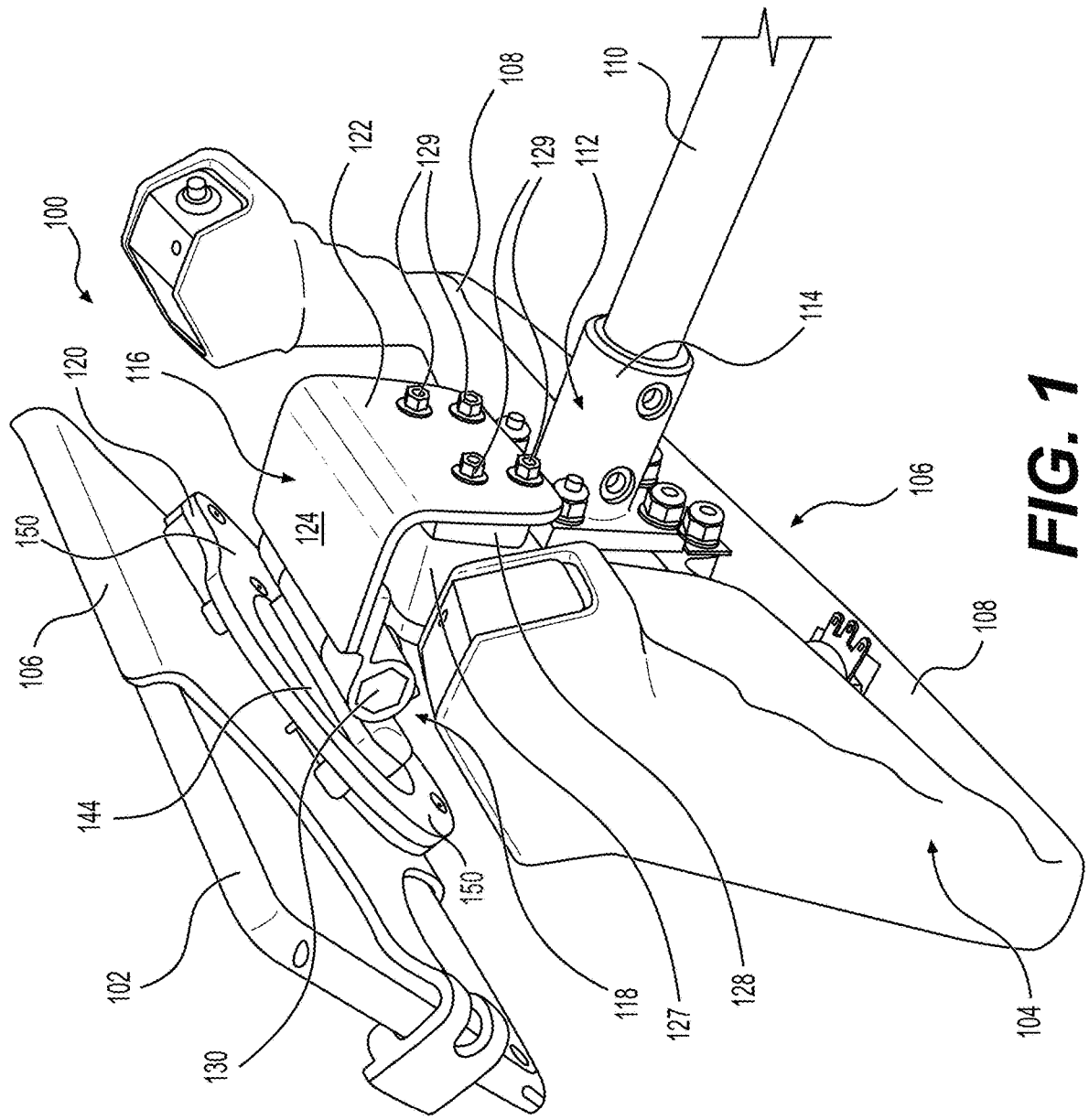
FIG. 1 is a perspective rear view of an embodiment for an article supporting and positioning system.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Embodiments provide systems and a method for holding and positioning a mobile device to an aircraft yoke. In the disclosed embodiment, a system 100 is used to rear mount a conventional electronics device 102 to an aircraft yoke 104. The electronics device can be a tablet computer, smart phone, or really any other electronics device regardless of whether wirelessly enabled or not. Here, an electronics device holder 106 receives the electronics device 102 in a snap-in arrangement. Other sorts of holders, however, exist that would work with system 100 equally well.

Those skilled in the art will recognize that a conventional yoke 104 includes a control wheel/handle 108 which is used to spin, angularly rotate, push in, or retract a control shaft 110.

Control shaft 110 is, in embodiments, received into a collar bracket 112 which includes a receiving collar 114, and an L-bracket 116. The L-bracket 116, hinged-swivel-connector 118, and a holder connection plate 120 are used cooperatively to secure and position the holder 104 for the mobile device, e.g., tablet computer, smart phone.

The L-bracket 116 is defined to be a bracket which has a general "L-shape," simply meaning that the bracket comprises two portions formed or joined around a bend. The term L-shape is not intended to limit the L-bracket 116 such that it requires portions which are perfectly perpendicular or of a certain relationship in shape or length, nor does the bend of the L-bracket 116 need to be a sharp or perfectly 90-degree corner. The bend of L-bracket 116 may have a rounded shape and/or the angle formed by the bend may be greater or less than 90 degrees without deviating from the scope of the claimed invention.

L-bracket 116 includes a substantially vertical yoke connection arm flange 122. Flange 122 is bolted through a spacer 128 into the rear of a center portion of the yoke handle 108. Plate 122 and spacer 128 each have four aligned holes bored therethrough for receiving four bolts secured using four nuts 129. The four bolts pass through a center portion 127 of the fly-wheel handle 108 (heads of the bolts, not shown, are on the other side of the center portion 127) to sandwich the spacer 128 and secure the bracket 116. Spacer 128 enables a flush connection to be made between the center portion 127 of the handle 108 and the yoke connection arm flange 122 of the L-bracket 116.

L-bracket 116 also includes a forwardly-extending slightly-off-horizontal flange 124 that is secured onto a yoke-side connection flange 126 of the hinged connector 118 by fasteners or welding.

Figure 2:
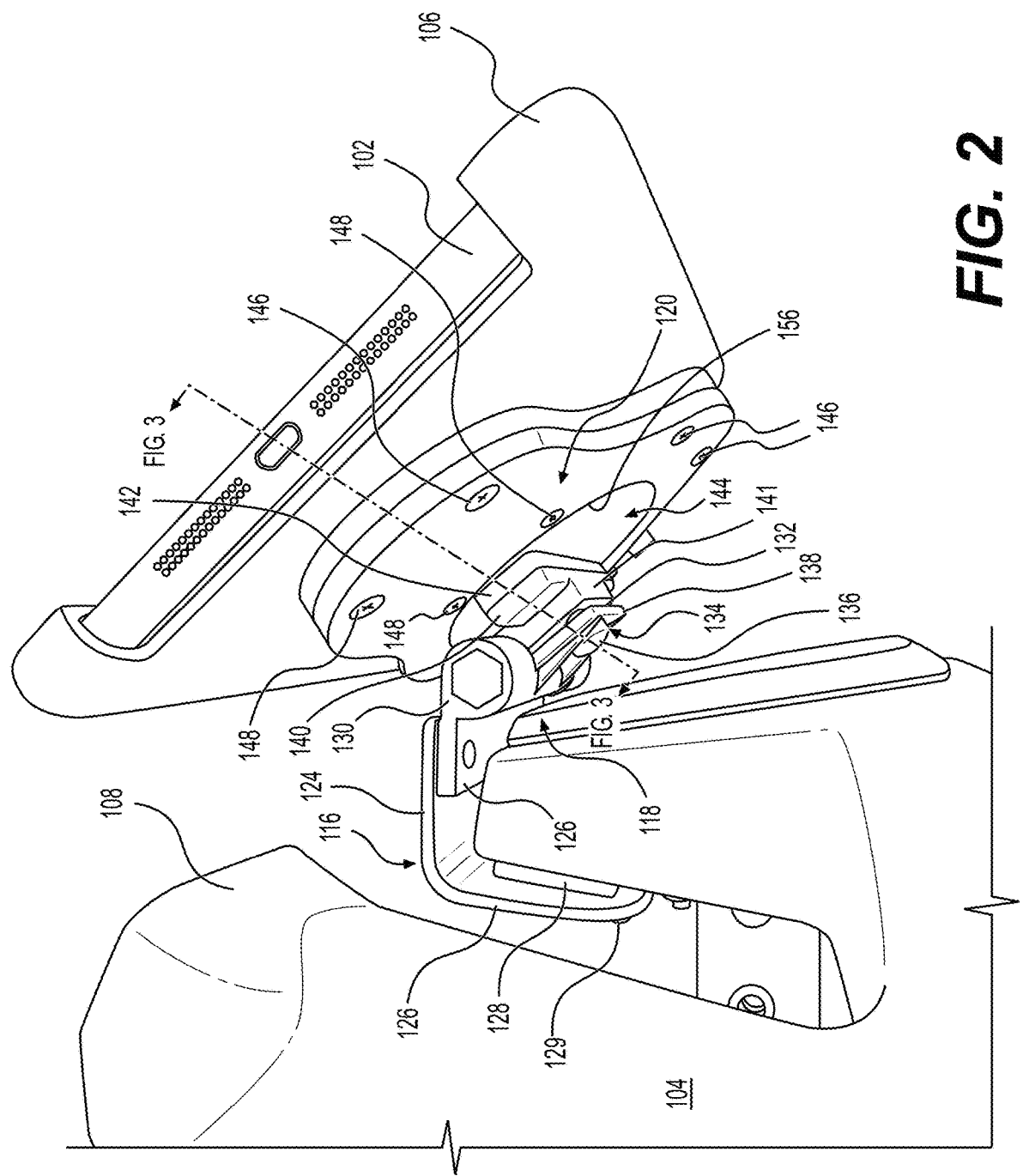
FIG. 2 is a more forward perspective of the article supporting and positioning system.

A transverse hinge 130 rotates on a substantially left-and-right axis (on an offset perpendicular axis relative to the control shaft 110) to establish an ability to rotate up and down between the yoke-side connection flange 126 and a more forward holder support flange 132 (see FIG. 2). Holder support flange 132 cooperates as a part of an adjustable-tension hinge arrangement 134, which includes a tension adjustment screw 136. Those skilled in the art will recognize that this sort of screw-actuated arrangement enables the user to increase or decrease friction to make the up-and-down movement of the holder 106. The frictional resistance to movement can be tightened or loosened using a screwdriver to tighten the holder support flange 132 towards an opposing alligator jaw 138. Tightening screw 136 creates more grip around the axis of rotation, and thus, resistance to movement.

A first mounting block 140 portion of the support flange 132 has an integral upcropped portion 141, and both of portions 140 and 141 are integrated with a second mounting block portion 142 all of which are integral with, and thus, rotate along with a trapped disk 144. Blocks 140 (along with upcropping 141) and 142 together provide clearance for rotation of the holder 106 relative to the handle 108.

A structural arrangement in which the disk is secured includes a connection plate system 120. Trapped disk 144 provides a platform on which the holder connection plate system 120 is able to pivot relative to the viewing plane of an electronics device (e.g., tablet 102) in the holder 106. This rotation can be accomplished by a user manually spinning the holder 106 to a desired viewing orientation.

The resistance offered against this rotation of the holder is controlled by establishing how tightly the disk 144 is held in the connection plate 120, which is secured to the back of the holder by a plurality of radially outer fasteners 146 and a plurality (four in the disclosed embodiment) of spaced-apart and clocked radially inner fasteners 148 (see FIG. 2). The outer fasteners 146 primarily serve to secure the mounting plate 120 to the holder 106 while the inner fasteners 148 execute both holding but also friction-setting functions. The inner fasteners 140, in embodiments, are equally clocked at angles about the outside of the disk and can be adjusted to create or remove the disk-holding friction.

Figure 3:
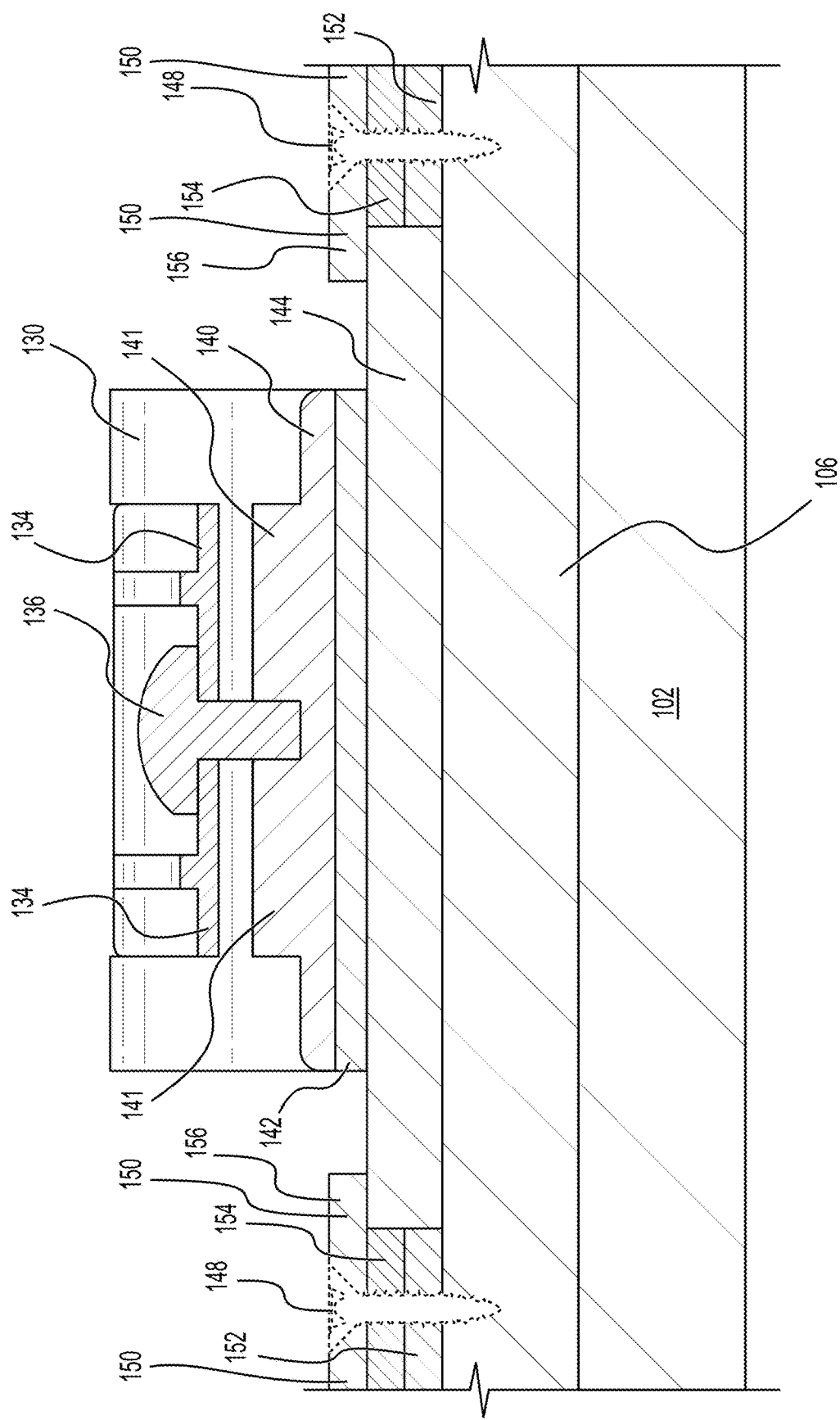
FIG. 3 is a sectional drawing taken at 3-3 in FIG. 2.

The friction-setting functions established by the inner fasteners 148 can be additionally understood looking at the cross section shown in FIG. 3. The section of FIG. 3 is taken at 3-3 in FIG. 2. Referring to the section, the outer margins of the trapped disk 144 are shown being secured by an inwardly extending circular ledge 156 established by a retaining plate 150.

The sectional of FIG. 3 also reveals that the structural arrangement/mount 120, in embodiments, is comprised of three plates, more specifically, that the retaining plate 150 is secured atop a base plate 152 and an intermediate plate 154. The stacked base and intermediate plates 152 and 154 define apertures therein sized to receive the trapped disk 144. An axially-centered aperture made into retaining plate 150 is sized to be slightly smaller than the trapped disk 144 (and thus, the apertures made through plates 152 and 154). This, thus, defines the circular internally-extending ledge 156 which clamps down on the outer margins of the disk 144 with a force level established by the inner fasteners 148.

The radially outer fasteners 146 penetrate the back side of the holder 106, and thus, are used mainly for securement. The clocked inside screws 148, however, only penetrate to the level of the base plate 152 (see FIG. 3). The close proximity of the radially-inward clocked screws 148 to the ledge 156 enables them to control the tightness with which the outer margins of the trapped disk 144 are held by the mount 120. Thus, these four screws 148 can be operatively tightened or loosened to make the friction fit what the user wants so that the holder can be moved to different positions easily by hand but will remain firmly in position when released.

Overall, the trapped disk arrangement enables a user to roll the electronic device 102 in circular movement clockwise or counterclockwise about the center axis of the trapped disk 144 into any number of roll positions, and upon release, the electronic device 102 will hold in position. In another dimension of rotation, and simultaneously, the user can rotate the electronics device to different pitch angles up or down about hinge 130. Again, on release, the device 102 will be held in position due to friction created by the tension hinge arrangement. Electronic device 102 is thus, able to be rotated up or down on a first axis of rotation, or be spun on a second axis of rotation into any desired position to the advantage of the user.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A system for positioning an electronics device holder, the system comprising:
    an L-bracket with a first portion that is mounted to a rear portion of an aircraft handle, and a forwardly-extending second portion on which a first side of a hinge is connected and supported, wherein the hinge accommodates an angular rotation in a first angular dimension relative to the aircraft handle; and
    a pivotal connection on a second side of the hinge, the pivotal connection establishing rotation in a second angular dimension, the second angular dimension being substantially parallel to a plane established by an electronics device being held in the electronics device holder.

2. The system of claim 1 wherein the hinge is a frictional hinge which enables the electronics device holder to remain in a position in the first angular dimension.

3. The system of claim 2 wherein a level of friction presented by the frictional hinge is made to be adjustable using an adjustment screw.

4. The system of claim 1 wherein the pivotal connection comprises a disk made to be rotatable and frictionally but rotatably secured inside a structural arrangement between the electronics device holder and the hinge, the disk enabling the electronics device holder to remain in a position in the second angular dimension.

5. The system of claim 4 wherein a level of roll-resistance offered against this rotation of the electronics device holder is established by a level of tightness established by the structural arrangement in which the disk is secured.

6. The system of claim 5 wherein the structural arrangement includes a disk-receiving recess into which the disk is received, the disk being secured in the disk-receiving recess by a containing plate which is sized to have a diameter which is slightly smaller than a diametric size of the disk.

7. The system of claim 6 wherein a circular inner margin of the containing plate establishes a circular internally-extending ledge which contains the disk in the disk-receiving recess.

8. The system of claim 7 wherein the circular internally-extending ledge clamps down on an outer margin of the disk to create an amount of margin-applied friction against movement enabling establishment of a plurality of various circular positions of the electronics device holder.

9. The system of claim 8 wherein the margin-applied friction is established by one or more fasteners installed through the containing plate proximate the circular internally-extending ledge.

10. The system of claim 9 wherein the one or more fasteners comprise a plurality of clocked fasteners installed through the containing plate proximate the circular internally-extending ledge.

11. The system of claim 10 wherein the structural arrangement comprises a base plate on which the disk-receiving recess exists, the disk-receiving recess being defined by an inner edge of one or more intermediate plates, the inner edge of the one or more intermediate plates being sized to include the disk.

12. The system of claim 11 wherein the plurality of clocked fasteners can be operatively tightened apply the margin-applied friction or loosened to reduce the margin-applied friction to establish a desired friction level.

13. The system of claim 12 wherein the plurality of clocked fasteners pass through the containing plate and the one or more intermediate plates then into the base plate.

14. The system of claim 1 wherein the hinge is mounted on a forward end of the L-bracket such that the electronics device holder has freedom of movement.

15. The system of claim 14 including a spacer mounted between the first portion of the bracket and a center yoke portion of the handle, the spacer establishing a flush connection between the first portion of the bracket and the center yoke portion.

16. The system of claim 1 wherein the rotation in the first angular dimension is circular in either clockwise or counterclockwise directions.

17. The system of claim 1 wherein the rotation in the second angular dimension is pivotal upward or downward.

18. A system comprising:
a first side of a friction hinge physically secured to an aircraft control stick assembly; and
a second side of the friction hinge supporting a disk made to be frictionally secured but rotatable within a securement arrangement when the disk is secured in a disk-receiving recess by a containing plate;
wherein the containing plate is sized to have a diameter which is slightly smaller than a diametric size of the disk;
wherein the securement arrangement is on a back side of an electronics holder such that the electronics holder is movable circularly into a plurality of clockwise and counterclockwise positions;
wherein the disk provides a level of roll-resistance against rotation of the electronics device holder, allowing the electronics device holder to remain in a set position; and
wherein the level of roll-resistance is established by a level of tightness established by the securement arrangement in which the disk is secured.

* * * * *